G. COLLIS.
ICING DEVICE.
APPLICATION FILED JUNE 9, 1913.
1,130,377.
Patented Mar. 2, 1915.
2 SHEETS—SHEET 1.
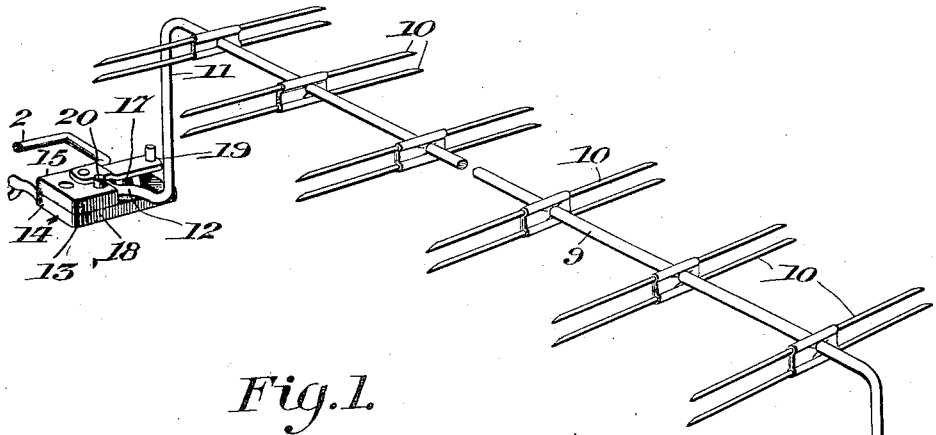
Fig.1.
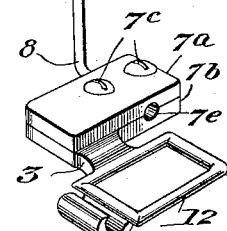
Fig.2.
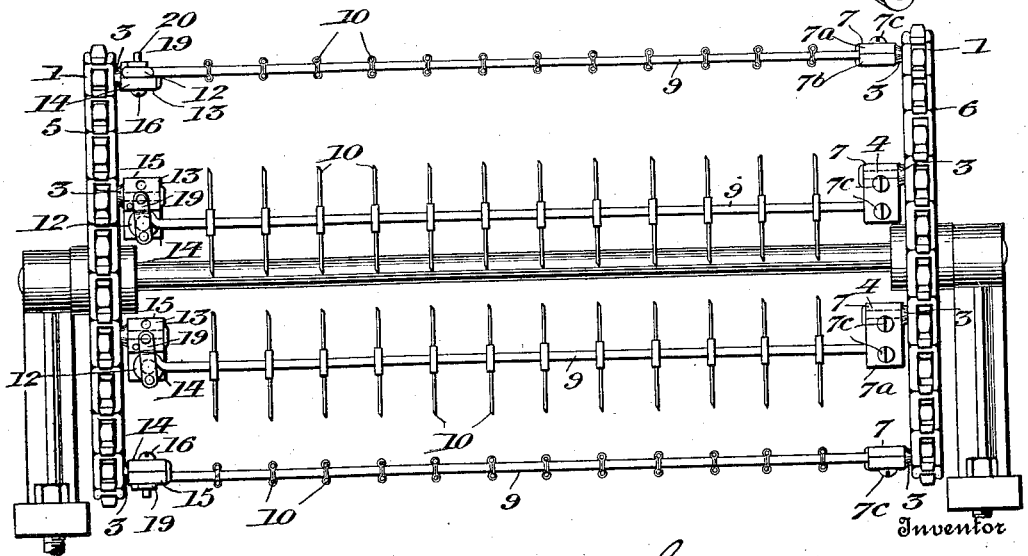
Witnesses
Philip E. Barnes
J. M. Copenhaver
Inventor
George Collis
By Edmund H. Parry
Attorney

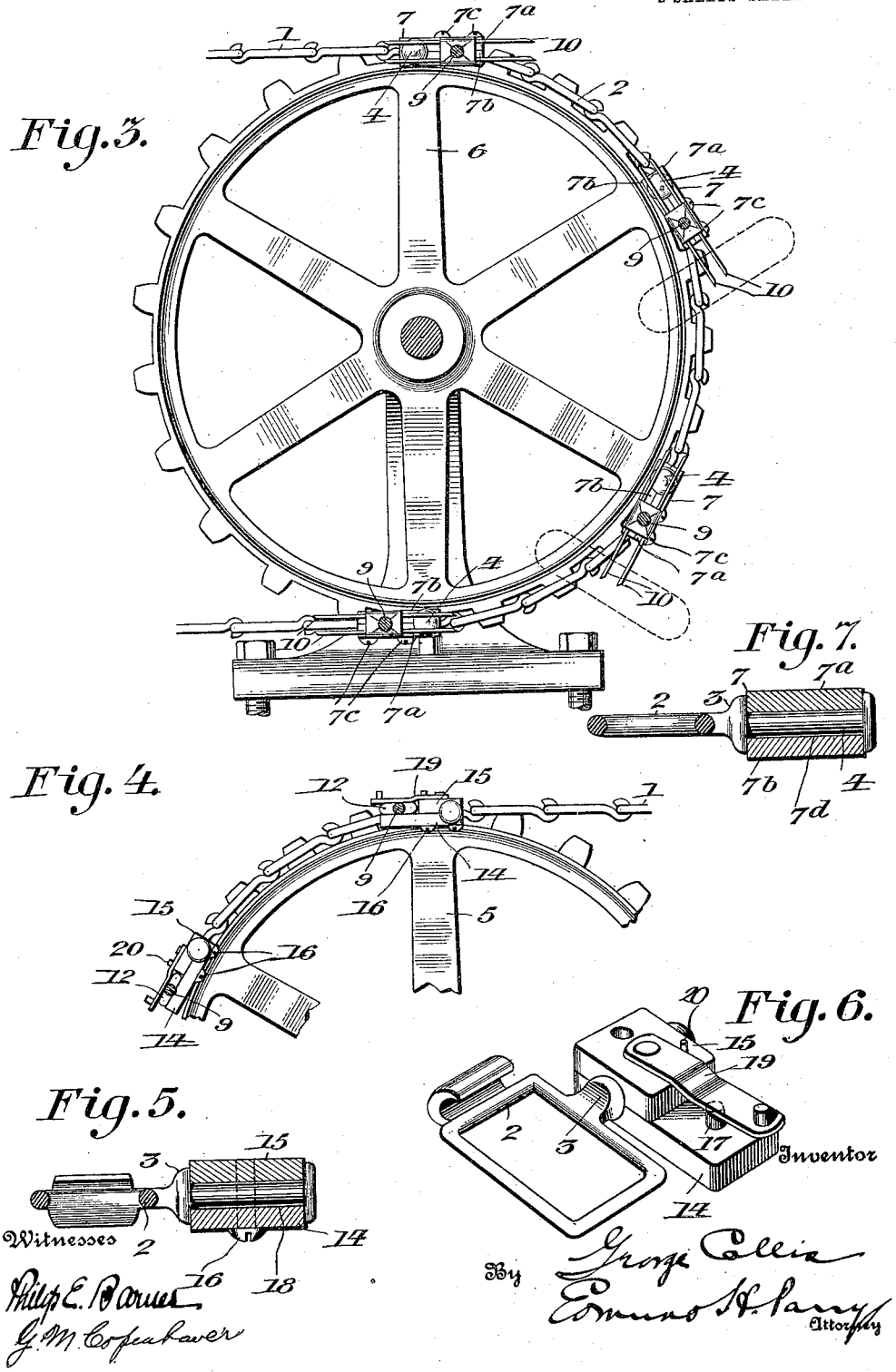

UNITED STATES PATENT OFFICE.

GEORGE COLLIS, OF CLINTON, IOWA.

ICING DEVICE.

1,130,377.   Specification of Letters Patent.   Patented Mar. 2, 1915.

Application filed June 9, 1913. Serial No. 772,645.

*To all whom it may concern:*

Be it known that I, GEORGE COLLIS, a citizen of the United States, residing at Clinton, in the county of Clinton and State of Iowa, have invented certain new and useful Improvements in Icing Devices, of which the following is a specification, reference being had therein to the accompanying drawing.
This invention relates to apparatus employed in connection with coating or icing articles of food and the like, and particularly to devices for securing an article-holding rack to a traveling element which may be in the form of a link chain.

It is customary, in icing cookies or the like, to employ a so-called "rack" upon which the articles are placed by an operator. This rack comprises, for instance, a supporting-bar provided with a series of pairs of pointed wires, with means at one end for attaching the rack to a suitable carrier, and with means at the opposite end for manually turning the rack occasionally. The articles, such as cookies, are pushed onto the points and, when the rack is full, the cookies and rack are dipped into a suitable mixture for coating them, as with an icing sugar, chocolate, or the like. The racks are then hung on the carrier which travels along for several hundred feet during which time the cookies dry. As there is a tendency for the icing or the like to run to one side or the other, it becomes necessary for the operator to turn the rack so as to reverse the position of the cookies, whereupon the "drip" which has formed will have a tendency to run back. While one turning is usually sufficient, yet, in these known devices, the operator must be on the alert in order to determine the critical moment when the turning must be effected, whereupon the turning must be accomplished manually.

The object of my invention is to provide a structure which will so operate that it becomes unnecessary for the operator manually to turn the rack, as this can be accomplished automatically. The structure is susceptible of embodiment in various forms.
Where the equipment in a bakery shop, for instance, is to be installed anew, one form of rack-attaching device may be employed; whereas, if the shop be already equipped with certain apparatus, including a traveling link chain, it is desirable to provide a rack-attaching device which is adapted for application to that particular equipment.

In the accompanying drawings, therefore, I have illustrated my invention as embodied, first, in a form adapted for a new installation; and, in the second place, in a form which is adapted for an equipment already in use. It is to be understood that these two types of embodiment simply serve in connection with the following description to explain the principles of the invention and are merely illustrative thereof. Other embodiments may be employed and be within the spirit of my invention.

In the drawings: Figure 1 is a view in perspective of the rack attached to a traveling carrier; the construction here being that which would be supplied with a new equipment; Fig. 2 is an elevational view, the illustration here being that which would be supplied for an old equipment but including my improved form of rack-attaching devices; Fig. 3 is a view in vertical section of a portion of the structure, including the carrier chain and one of its supporting-wheels; Fig. 4 is a fragmentary view showing the form of rack-attaching device by which the opposite end of the rack is attached to the carrier chain; Fig. 5 is an enlarged view in section of said last-mentioned rack-attaching device; Fig. 6 is a view in perspective thereof; and Fig. 7 is an enlarged sectional view of the rack-attaching device at the opposite side of the structure.

In the drawings, the numeral 1 designates endless carriers which, preferably and as shown, are in this instance in the form of link chains, the links 2 of which are provided with extensions 3, the same being reduced as shown in the species of Figs. 2 to 7 to form a bearing portion 4, the purpose of which will presently be explained. The carriers preferably are supported by and travel over wheels 5 and 6, and whereby the chains are so positioned that one portion thereof overlies and travels over another portion, as shown. Embracing the extension of a link of one chain is an extension clamping-block 7 which, preferably and as shown, comprises two plates 7$^a$ and 7$^b$ suitably secured together, as by screws 7$^c$. The companion plates 7$^a$ and 7$^b$ are recessed to provide an aperture 7$^d$ in which the bearing portion of the link extension is positioned. The plates are further provided with recesses to form an aperture 7ᵉ. Into this aperture the angulated end 8 of a rack bar 9 is inserted. This bar carries a plurality of pairs of article-holding elements or wires 10 which are secured to the bar in any appropriate manner but preferably as described in an application filed by me on the 9th day of June 1913, Serial No. 772,644. This improved method of attaching the wires contemplates the electric welding of the same to the bar, after which reinforcing plates are soldered to the wires, to the bar and to each other, whereby a rigid and strong securement of the wires to the bars is effected. The opposite end of the rack bar is angulated to provide an end 11 formed as an eye 12 that constitutes one component of the rack-securing means. The other component of this means includes a two-part block 13 comprising two plates 14 and 15 which, preferably and as shown, are of different size, the plate 15 being smaller than the plate 14. These two plates are secured together in any suitable way, as by screws 16. The plate 14 is provided with a lug or post 17 which is adapted to be inserted in the eye 12. The plates are formed with recesses to provide an aperture 18 into which an extension of a chain link is disposed. Pivotally mounted upon the block is a latch 19 which is adapted to be positioned over the lug or post 17 in the plate 14 and be limited in its movement in one direction by an upstanding stud 20 in the plate 15.

When it is desired to attach a rack to the carrier, the angulated end 8 of the rack is inserted in the block 7, and the opposite, eye-provided end of the rack is placed over the post 17, whereupon the latch is moved into a position over the post and effectually holds that end of the rack against displacement from its attaching block.

Assuming that the cookies or other food articles have been placed upon the rack and that the same have been dipped and coated, it will be seen that, when the racks pass around the wheel 5, said racks, by reason of the fact that they are secured (at one or both ends) to the rack against rotating on their own axis, will be reversed so that the cookies will, thus, be turned and, thus, the running of the icing all to one side is prevented. Obviously, the cookies may be turned as often as may be desired, merely by passing the chain links over wheels so that the racks will then travel in a different direction from what was their direction of travel when they started.

Various forms of devices suggest themselves for securing the eye-provided end of the rack to the traveling chain—for instance, a flexible spring could be riveted to the plate 15 so that it would close down upon the eye and hold it securely; but I have found, as a result of practical use, that the construction shown is most satisfactory. The object of this particular form of structure is to hold the attaching hanger of structure from swinging during its journey. Moreover, it is of such construction as to be easily manipulated by the operator.

Any appropriate means for driving the chain may be employed; and, as such driving mechanism is not a part of my invention, I do not deem it essential to illustrate the same herein.

As will now be understood from the foregoing, my invention contemplates the provision of rack-attaching means whereby an article-holding rack may be attached to a traveling carrier in such manner that the rack will be given a partial turn in the course of its travel, automatically and without any manual manipulation thereof. In addition, attachment of the rack to the carrier is quickly and easily accomplished.

The structure described in the foregoing is that which would usually be supplied for use in connection with an equipment already in use: Where, however, the equipment is to be new, I would construct the rack-attaching means in somewhat different form and preferably that which is shown in Fig. 1: In this instance, the attaching blocks are formed integral with the chain links.

Having thus described my invention, what I claim is:

1. Apparatus for holding articles of food for icing or coating, including a traveling carrier comprising a pair of link chains formed of links provided with extensions; a rack adapted to be interposed between said chains; and rack-attaching blocks mounted on said link extensions, one of said blocks including a latch.

2. Apparatus for holding articles of food to be iced or coated, including in combination, a pair of traveling link chains, the links of which are provided with extensions; a block mounted on one of said extensions and including a pair of companion plates embracing said extension and an angulated end of said rack; and a second block comprising a pair of plates of different size adapted to embrace a link extension, and a latch pivoted to one of said blocks and extending beyond the end thereof so as to overlie a portion of the other plate, and a stud carried by said other plate adapted to project into an eye provided on an angulated end of said rack.

3. Apparatus for holding articles of food for icing and coating, including in combination, a pair of carrier chains, the links of which are provided with extensions formed with bearing portions; wheels for supporting said chains; an article-holding rack adapted to be interposed between said chains and comprising a body-portion, angulated end-portions, one of said portions being provided with an eye; a rack-attaching block embracing a link extension and one of said angulated rack end-portions; and a second rack-attaching block comprising two plates, a stud carried by one of said plates, and a latch carried by the other of said plates and adapted to occupy a position over said stud when said eye embraces the stud.

4. Coating apparatus including an article-holding rack, means for turning the same comprising a traveling, endless carrier, and means mounted on the carrier for attaching the rack at opposite ends to said carrier consisting of rack-attaching blocks mounted on the carrier and embracing the ends of said rack, one of said blocks carrying a latching-device engageable with the rack.

5. Coating apparatus including an article-holding rack, means for turning the same comprising a traveling, endless carrier, means mounted on the carrier for attaching the rack at opposite ends to said carrier consisting of rack-attaching blocks mounted on the carrier and embracing the ends of said rack, one of said blocks being formed with a rack-receiving recess, and the other including a latching-device engageable with the rack and supporting wheels upon which said carrier is mounted.

6. Coating apparatus including an article-holding rack, means for turning the same at predetermined intervals of time comprising a traveling, endless carrier, means mounted on the carrier for attaching the rack at opposite ends to said carrier consisting of rack-attaching blocks mounted on the carrier and embracing the ends of said rack, one of said blocks being formed with a recess in which one end of the rack is journaled, the other block carrying a latching-device engageable with the opposite end of the rack and supporting wheels upon which said carrier is mounted.

In testimony whereof I affix my signature in presence of two witnesses.

GEORGE COLLIS.

Witnesses:
 FRIEDA E. TRITSCHLER,
 MARCELLA BURKEN.

Copies of this patent may be obtained for five cents each, by addressing the "Commissioner of Patents, Washington, D. C."